Patented Nov. 16, 1943

2,334,470

UNITED STATES PATENT OFFICE 2,333,470

ANTI-FLEX-CRACKING AGENT

Robert T. Armstrong, Radburn, N. J., assignor to United States Rubber Company, New York, N. Y., a corporation of New Jersey No Drawing. Application December 19, 1940, Serial No. 370,843

5 Claims. (Cl. 260—810)

This invention relates to improvements in anti-flex-cracking agents for rubber and rubber-like materials, and to the products containing said agents.

An object of the invention is to provide cheap available chemicals which have been found to possess the property of inhibiting fatigue failure or cracking due to repeated flexings of rubber, and with substantially no discoloration of the rubber when it is exposed to atmosphere and sunlight. Other objects will be apparent from the following description.

Broadly the invention comprises incorporating in a rubber composition a para-tertiary alkyl phenol as an anti-flex cracking agent. Among the better known chemicals of this class are p-tertiary butyl phenol

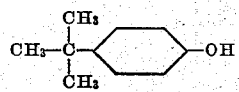

and p-tertiary amyl phenol

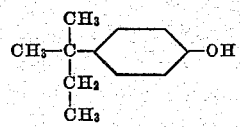

although others in the class with longer open-chain structures may also be used.

The data in the following table illustrates the property of these chemicals to inhibit fatigue failure due to repeated flexings of the rubber and compared with use of phenol itself. The chemical (1% based on the rubber) was added on a laboratory mill at approximately 180° F. to a typical tire tread compound (A) containing by weight:

| | |
|---|---|
| Rubber | 100 |
| Carbon black | 45 |
| Softener | 7 |
| Zinc oxide | 2 |
| Accelerator | 1 |
| Sulfur | 2.5 |

Slabs one-tenth-inch thick were cured 35 minutes at 146.5° C. in a mold, and samples cut from the cured slabs were flexed to failure.

| | (A) (Control) | (B) Phenol (1.0) | (C) p-Tertiary butyl phenol (1.0) |
|---|---|---|---|
| Tensile strength, lbs./sq. in. | 3,900 | 3,800 | 4,200 |
| Flexing [1] to failure | 63 | 61 | 90 |

[1] Standard De Mattia flexing test: 300 cycles/min. through a "hair-pin" bend to 100% elongation, at room temperature.

Comparison of the results on compound A with those on compound B shows that phenol itself does not inhibit the fatigue failure, whereas the results on compound C show a marked improvement by the use of a para-tertiary-alkyl phenol. Correspondingly greater improvements are obtained by using larger proportions of para-tertiary butyl phenol.

The anti-flex cracking agents may be used in amounts varying from 0.1% to 5% by weight based on the rubber or rubber-like material.

It is to be understood that while in the example of rubber mixes given above certain vulcanizing ingredients are disclosed, the invention is not limited thereto but may be carried out by the use of other suitable vulcanizing agents, fillers, accelerators, etc. The anti-flex cracking agent may be incorporated in the rubber on the mill, or incorporated therein by diffusion from solution containing the agent, or otherwise.

With the disclosure given above, it is obvious that modifications will suggest themselves, for example other rubbers than caoutchouc rubbers, namely those rubbers which are artificially prepared to simulate the elastic properties of ordinary rubber, may likewise be treated according to the invention, and it is not desired to limit the invention otherwise than as set forth in the appended claims.

Having thus described my invention, what I claim and desire to protect by Letters Patent is:

1. A process of improving the flex-cracking properties of rubber compositions designed for repeated flexing during use, which comprises incorporating therein as an anti-flex-cracking agent a phenol, the position para to the phenolic hydroxyl group being occupied by a tertiary alkyl group.

2. A process of improving the flex-cracking properties of rubber compositions designed for repeated flexing during use, which comprises incorporating therein as an anti-flex-cracking agent a compound having the formula

where A is a tertiary alkyl group, and curing the rubber.

3. A process of improving the flex-cracking properties of rubber compositions designed for repeated flexing during use, which comprises incorporating therein as an anti-flex-cracking agent, p-tertiary butyl phenol.

4. A process of improving the flex-cracking properties of rubber compositions designed for repeated flexing during use, which comprises incorporating therein as an anti-flex-cracking agent, p-tertiary-amyl phenol.

5. A vulcanized product of a rubber composition containing a para-tertiary-alkyl phenol as an anti-flex cracking agent.

ROBERT T. ARMSTRONG.